US011520457B1

(12) United States Patent
Neves Creto et al.

(10) Patent No.: US 11,520,457 B1
(45) Date of Patent: Dec. 6, 2022

(54) CURSOR POSITION BASED ON FOCUS OF A GLASSES DEVICE

(71) Applicant: Motorola Mobility LLC, Chicago, IL (US)

(72) Inventors: Alexandre Neves Creto, São Paulo (BR); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/529,555

(22) Filed: Nov. 18, 2021

(51) Int. Cl.
*G06F 3/04812* (2022.01)
*G06F 3/01* (2006.01)

(52) U.S. Cl.
CPC .......... *G06F 3/04812* (2013.01); *G06F 3/012* (2013.01); *G06F 2203/04801* (2013.01); *G06F 2203/04803* (2013.01)

(58) Field of Classification Search
CPC .............. G06F 3/04812; G06F 3/012; G06F 2203/04801; G06F 2203/04803
See application file for complete search history.

(56) References Cited

U.S. PATENT DOCUMENTS

2018/0107181 A1* 4/2018 Jung .................. G02B 27/0172
2019/0215503 A1* 7/2019 Monson .................. G06F 3/013
2020/0033942 A1* 1/2020 Saito ...................... G06F 3/167
2021/0366440 A1* 11/2021 Burns ...................... G06F 3/013
2022/0229534 A1* 7/2022 Terre ..................... G06T 19/006

OTHER PUBLICATIONS

"ThinkReality A3 Glasses", Lenovo [online][retrieved Sep. 8, 2021]. Retrieved from the Internet <https://www.lenovo.com/us/en/thinkrealitya3/>., Jan. 11, 2021, 6 Pages.
Benko, Hrvoje , "User Interaction in Hybrid Multi-Display Environments", Columbia University [retrieved Sep. 8, 2021]. Retrieved from the Internet <https://www.microsoft.com/en-us/research/wp-content/uploads/2016/12/User-Interaction-in-Hybrid-Multi-Display-Environments.pdf>., 2007, 230 Pages.
R, Pratik , "AR smart glasses: Applications, Challenges & Future Potential", Intuz blog [online] [retrieved Sep. 8, 2021]. Retrieved from the Internet <https://www.intuz.com/blog/augmented-reality-glass-application-usecases-challenges-future-potential>., Apr. 19, 2021, 28 Pages.

* cited by examiner

*Primary Examiner* — Amit Chatly
(74) *Attorney, Agent, or Firm* — FIG. 1 Patents

(57) ABSTRACT

Techniques for cursor position based on focus of a glasses device are described and are implementable to enable cursor positioning and repositioning between different visual regions displayed by a glasses device. The described implementations, for example, track changes in focus orientation of a user of a glasses device and reposition and/or activate a cursor based on the changes.

20 Claims, 14 Drawing Sheets

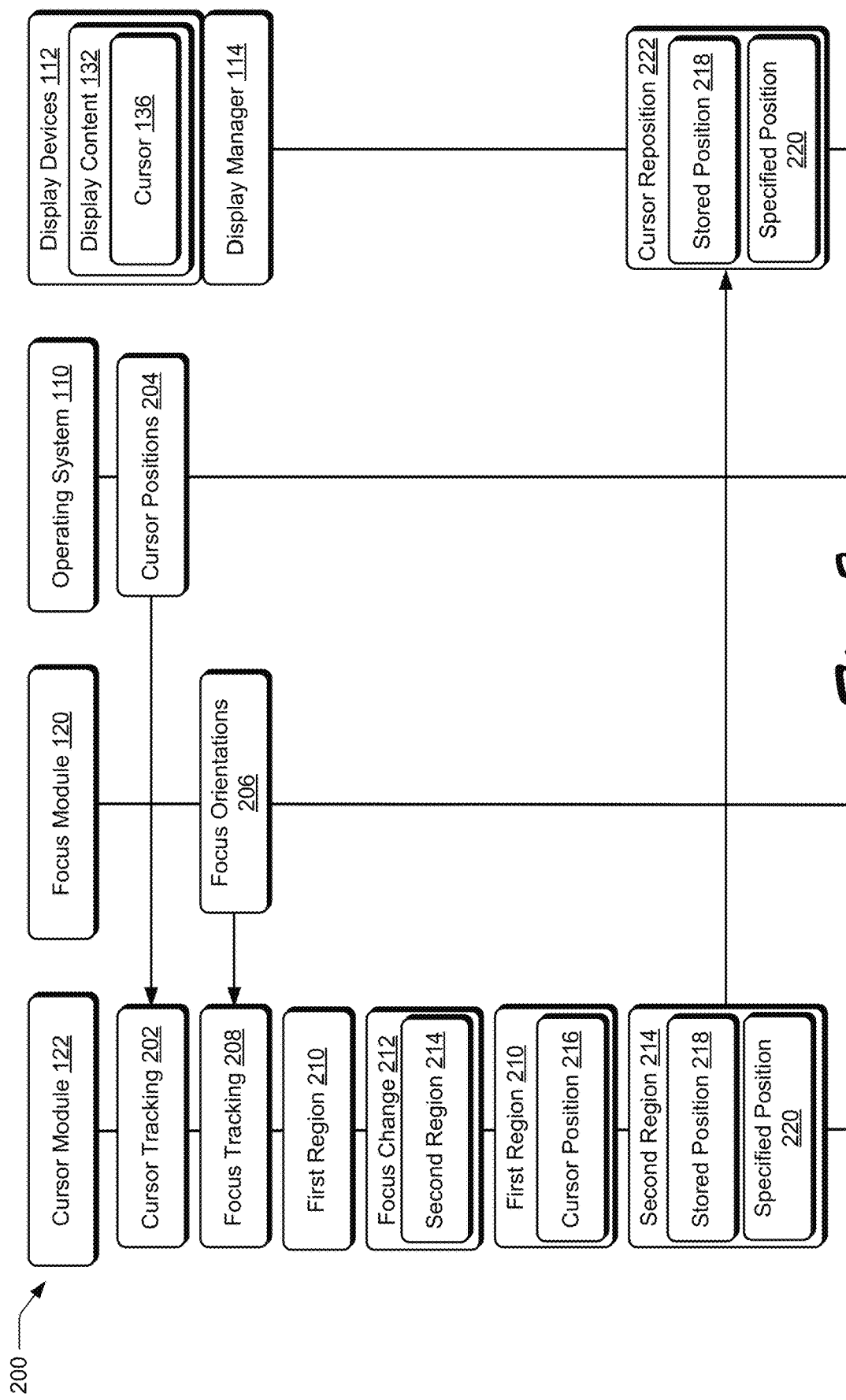

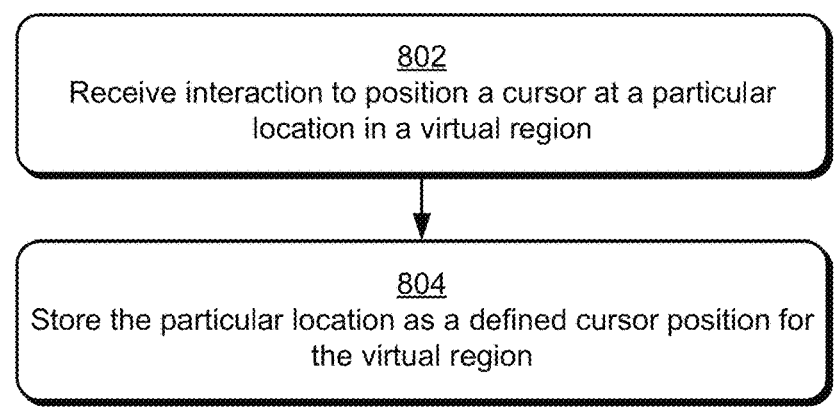
Fig. 8

CURSOR POSITION BASED ON FOCUS OF A GLASSES DEVICE

BACKGROUND

Today's person is afforded a tremendous selection of devices that are capable of performing a multitude of tasks. For instance, desktop and laptop computers provide computing power and screen space for productivity and entertainment tasks. Further, smartphones and tablets provide computing power and communication capabilities in highly portable form factors. One particularly intriguing device form factor is smart glasses which provide computing functionality in the form of wearable glasses. For instance, virtual reality (VR) glasses and augmented reality (AR) glasses (examples of "glasses devices") provide an interactive experience in which various types of computer-generated content ("virtual content") are displayable via a glasses device. Virtual content, for example, includes gaming content, productivity content, entertainment content, communication content, and so forth.

While the ability to display virtual content on a glasses device provides for numerous user experiences it also presents challenges for managing user interactions with virtual content. For instance, when multiple different instances of virtual content are displayed via a glasses device, conventional glasses devices encounter difficulty enabling a user to interact with a specific instance of the virtual content.

BRIEF DESCRIPTION OF THE DRAWINGS

Aspects of cursor position based on focus of a glasses device are described with reference to the following Figures. The same numbers may be used throughout to reference similar features and components that are shown in the Figures. Further, identical numbers followed by different letters reference different instances of features and components described herein.

FIG. 2 depicts an example system for cursor position based on focus of a glasses device in accordance with one or more implementations;

FIG. 8 illustrates a flow chart depicting an example method for user selection of a defined cursor location in accordance with one or more implementations;

DETAILED DESCRIPTION

Figure 1:
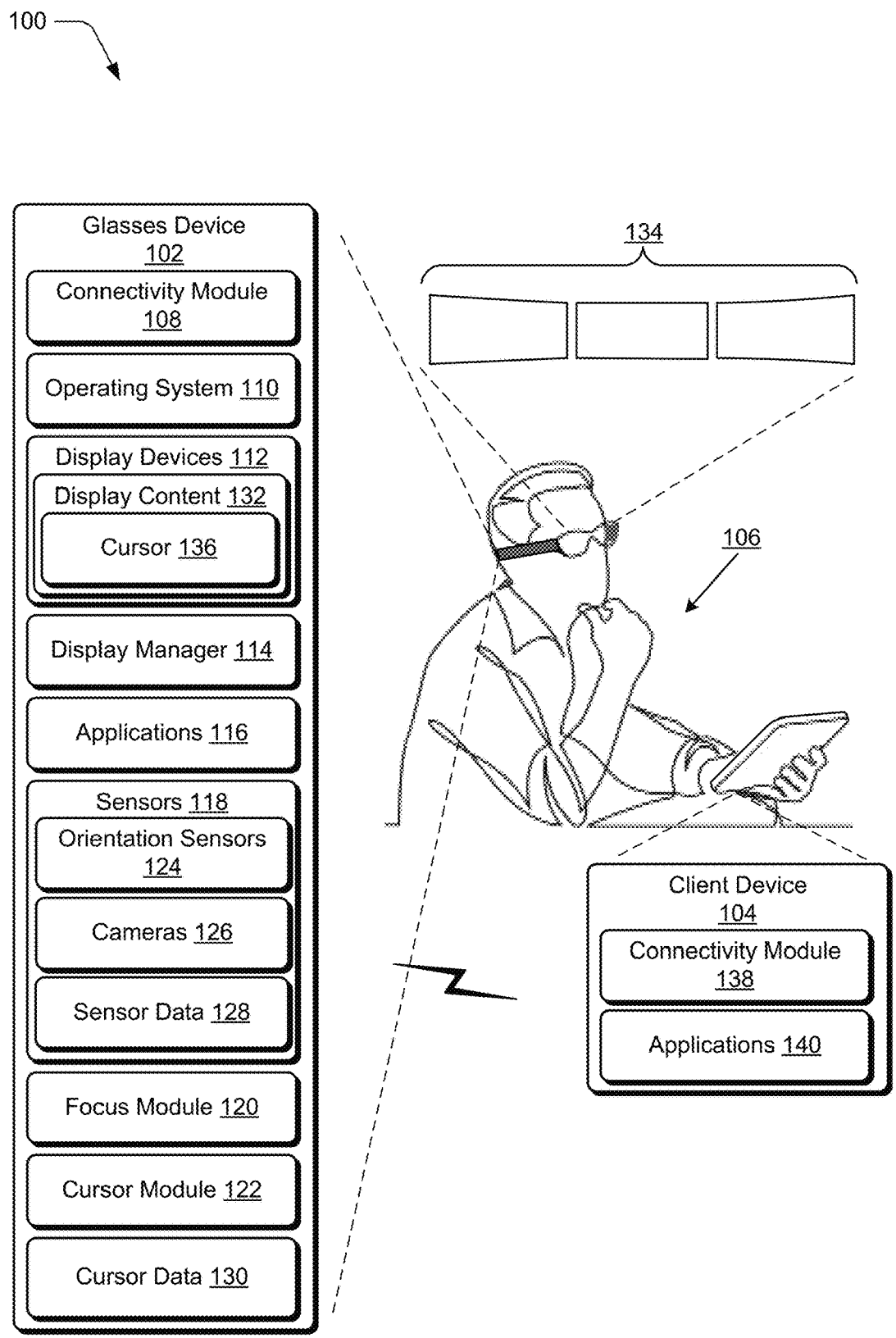
FIG. 1 illustrates an example environment in which aspects of cursor position based on focus of a glasses device can be implemented.

Techniques for cursor position based on focus of a glasses device are described and are implementable to enable cursor positioning and repositioning between different visual regions displayed by a glasses device. A glasses device, for instance, represents a computing device in a glasses form factor, such as augmented reality (AR) glasses, virtual reality (VR) glasses, smart glasses, and so forth. In conventional implementations of a glasses device, a user often loses track of cursor position in virtual content and is faced with the task of locating a cursor before the user is able to interact with the virtual content. Accordingly, the described implementations track changes in focus orientation of a user of a glasses device and reposition and/or activate a cursor based on the changes. This provides intuitive cursor positioning and/or activation that enables a user to quickly identify a cursor position, which addresses the drawbacks experienced in conventional glasses device implementations.

For instance, consider a scenario in which different virtual display regions ("virtual regions") are displayed by a glasses device. The virtual regions, for instance, are populated with different virtual content, such as graphical user interfaces (GUIs) for different applications. Further, a user (e.g., a wearer) of the glasses device is focused on a first virtual region such as part of interaction with content displayed in the first virtual region. For instance, orientation of the glasses device is tracked and utilized to determine where a user's attention is focused. In conjunction with user focus on the first virtual region a cursor is displayed in the first virtual region. Generally, the cursor represents a visual affordance for indicating a current position for user interaction with virtual content on the glasses device and identifies a current visual position that will respond to user input.

Further to this example, a change in orientation of the glasses device is detected indicating a change in user focus to a second, different virtual region displayed by the glasses device. The user, for instance, switches their focus to a different virtual region. Based on the change in focus to the second virtual region the cursor is repositioned from the first virtual region to the second virtual region. In one or more implementations to determine where to reposition the cursor into the second virtual region, it is determined whether a previous cursor position in the second virtual region is available. For instance, in conjunction with a previous user interaction with the second virtual region a position of the cursor is stored. Thus, if the previous position of the cursor in the second virtual region is available (e.g., stored) the cursor is repositionable to the previous position.

However, if a previous cursor position in the second virtual region is not available, the cursor is repositionable to a predefined cursor position. Generally, a predefined cursor position is definable in various ways, such as by an operating system associated with the glasses device, by an application that is represented in the second virtual region, based on a user-defined cursor position, and so forth. Accordingly, the cursor is repositionable to the second virtual region based on a known previous cursor position for the virtual region and/or a predefined cursor position associated with the second virtual region.

In an alternative or additional implementation, multiple cursors are simultaneously maintainable for different virtual regions displayed by a glasses device. For instance, individual instances of at least some virtual regions each include a respective cursor. Further, a first cursor for a first virtual region that is currently in a focus position of the glasses device is in an active state such that the first cursor responds to user input. Cursors in other virtual regions, however, are maintained in an inactive state. When a focus position of the glasses device switches to a second virtual region, the first cursor in the first virtual region is deactivated and a second cursor in the second virtual region is activated. Thus, the second cursor becomes the active cursor to enable user interaction with the second virtual region, e.g., with virtual content displayed in the second virtual region.

Accordingly, the described techniques are automated and are able to reposition and/or activate cursors presented by a glasses device based on focus detection for the glasses device. By automatically repositioning and/or activating cursors based on focus detection, the described techniques provide for increased efficiency and decreased user confusion as part of navigating and interacting with virtual content of a glasses device.

While features and concepts of cursor position based on focus of a glasses device can be implemented in any number of environments and/or configurations, aspects the described techniques are described in the context of the following example systems, devices, and methods. Further, the systems, devices, and methods described herein are interchangeable in various ways to provide for a wide variety of implementations and operational scenarios.

FIG. 1 illustrates an example environment 100 in which aspects of cursor position based on focus of a glasses device can be implemented. The environment 100 includes a glasses device 102 and a client device 104 associated with a user 106. In at least one implementation the glasses device 102 and the client device 104 are interconnectable such as via wireless and/or wired connectivity. Generally, the glasses device 102 represents an instance of a smart glasses device such as augmented reality (AR) glasses, virtual reality (VR) glasses, and so forth. Further, the client device 104 can be implemented in various ways and according to various form factors such as a smartphone, tablet device, a laptop computer, a wearable computing device, and so forth.

The glasses device 102 includes various functionalities that enable the glasses device 102 to perform different aspects of cursor position based on focus of a glasses device discussed herein, including a connectivity module 108, an operating system 110, display devices 112, a display manager 114, applications 116, sensors 118, a focus module 120, and a cursor module 122. The connectivity module 108 represents functionality (e.g., logic and hardware) for enabling the glasses device 102 to interconnect with other devices and/or networks, such as the client device 104. The connectivity module 108, for instance, enables wireless and/or wired connectivity of the glasses device 102. In a wireless scenario the connectivity module 108 enables connectivity and data communication via a variety of different wireless protocols, such as wireless broadband, Wireless Local Area Network (WLAN) (e.g., Wi-Fi), Wi-Fi Direct, wireless short distance communication (e.g., Bluetooth™ (including Bluetooth™ Low Energy (BLE)), Near Field Communication (NFC)), and so forth.

The operating system 110 represents functionality for managing hardware and software resources of the glasses device 102, such as for invoking and enabling communication between hardware and software resources. The display devices 112 represent functionality for visual output of content by the glasses device 102. In an example implementation the display devices 112 include a display surface and/or set of display surfaces and a projection device for projecting visual content onto the display surface(s). The display manager 114 represents functionality for controlling the display devices 112 such as for enabling content to be provided to the display devices 112 for display. Further, the display manager 114 enables state information for the display devices 112 to be provided to other functionalities of the glasses device 102, such as enabling determination of types and/or instances of content being output by the display devices 112.

The applications 116 represent functionality for performing various tasks via the glasses device 102, such as productivity tasks, gaming, web browsing, social media, and so forth. The sensors 118 represent functionality for detecting various physical and/or logic conditions pertaining to the glasses device 102. In this particular example the sensors 118 include orientation sensors 124 and cameras 126. The orientation sensors 124 represent functionality for determining an orientation of the glasses device 102 and for detecting changes in orientation of the glasses device. Examples of the orientation sensors 124 include an accelerometer, a gyroscope, a magnetometer, and so forth. Generally, the orientation sensors 124 enable a spatial orientation of the glasses device 102 to be detected and can be implemented in various ways to provide different types of orientation detection, such as 3 degrees of freedom (3-DOF), 6 degrees of freedom (6-DOF), 9 degrees of freedom (9-DOF), and so forth. The cameras 126 represent functionality for detecting visual objects in an environment surrounding the glasses device and can generate visual data that describes the visual objects. These examples of sensors 118 are not to be construed as limiting and sensors 118 are implementable to include a variety of different sensor types and sensor instances for sensing physical and logic phenomena.

The focus module 120 represents functionality for determining focus orientation attributes of the glasses device 102. For instance, the focus module 120 receives sensor data 128 from the sensors 118 and determines, based on the sensor data 128, a direction of focus of the glasses device 102. When the user 106 is wearing the glasses device 102, for example, the focus module 120 determines where the user's attention is focused based on an orientation of the glasses device 102.

The cursor module 122 represents functionality for implementing various aspects of cursor position based on focus of a glasses device described herein. For instance, the cursor module 122 enables dynamic positioning and/or activation of cursors based on focus orientation determined by the focus module 120. The cursor module 122 maintains and/or has access to cursor data 130 that tracks position information for cursors and enables cursor positioning and repositioning based on focus orientation and changes in focus orientation of the glasses device 102.

Consider, for example, a scenario where display content 132 is displayed on the display devices 112. The display content 132, for instance, includes virtual display regions ("virtual regions") 134 that are displayed by (e.g., projected onto) the display devices 112. Generally, the virtual regions 134 can be populated with various types of virtual content, such as content generated by the applications 116. Further, a cursor 136 is presented within the virtual regions 134 such as part of interaction by the user 106 with the display content 132. According to techniques for cursor position based on a focus of a glasses device the cursor module 122 tracks positioning of the cursor 136 relative to the virtual regions 134 and enables positioning and repositioning of the cursor 136 within the display regions such as based on changes in focus direction of the glasses device 102.

The client device 104 includes functionality that enables the client device 104 to participate in various aspects of cursor position based on focus of a glasses device described herein including a connectivity module 138 and applications 140. The connectivity module 138 represents functionality (e.g., logic and hardware) for enabling the client device 104 to interconnect with other devices and/or networks, such as the glasses device 102. The connectivity module 138, for instance, enables wireless and/or wired connectivity of the client device 104. The applications 140 represent functionality for performing various tasks via the client device 104, such as productivity tasks, gaming, web browsing, social media, and so forth. In at least one implementation content from the applications 140 is communicated to the glasses device 102 for output via the display devices 112. For instance, in at least one implementation the display content 132 represents content generated by an instance of the applications 140 and communicated to the glasses device 102 for output by the display devices 112. In at least one implementation, for example, instances of the applications 140 represent instances of the applications 116 executed by the client device 104 and communicated to the glasses device 102 for display by the display devices 112.

Having discussed an example environment in which the disclosed techniques can be performed, consider now some example scenarios and implementation details for implementing the disclosed techniques.

FIG. 2 depicts an example system 200 for cursor position based on focus of a glasses device in accordance with one or more implementations. Generally, the system 200 can be implemented in the environment 100 and incorporates attributes of the environment 100 introduced above. In the system 200 the cursor module 122 performs cursor tracking 202 based on cursor positions 204 of the cursor 136. The cursor positions 204, for example, represent positions of the cursor 136 in the display content 132. In at least one implementation the operating system 110 determines the cursor positions 204 such as based on user interactions with the display content 132 and provides the cursor positions 204 to the cursor module 122. Generally, the cursor tracking 202 enables the cursor module 122 to track cursor positions 204 and reposition the cursor 136 based on changes in user focus when interacting with the display content 132.

Further to the system 200, the focus module 120 determines focus orientations 206 that determine user focus orientations relative to the display content 132. The focus orientations 206, for instance, are based on orientation of the glasses device 102. For example, the focus module 120 receives sensor data 128 from the sensors 118 to determine orientation of the glasses device 102 and correlates the orientation to focus orientations 206 of a user relative to the display content 132. The focus module 120 provides the focus orientations 206 to the cursor module 122 which enables the cursor module 122 to perform focus tracking 208. The focus tracking 208, for example, correlates user focus to different regions of the display content 132. Utilizing the focus tracking 208 the cursor module 122 determines a first focus region ("first region") 210 of the glasses device 102, which indicates a region of the display content 132 that is a subject of user focus.

Further to the system 200 and based on the focus tracking 208, the cursor module 122 detects a focus change 212 to a second focus region ("second region") 214. The focus change 212, for instance, indicates that an orientation of the glasses device 102 changes such that a user focus changes from the first region 210 to the second region 214, e.g., from a first region of the display content 132 to a second, different region of the display content 132. In response to the focus change 212 the cursor module 122 stores a cursor position 216 for the first region 210. Generally, storing the cursor position 216 enables the cursor 136 to be repositioned if user focus returns to the first region 210.

Based on the focus change 212 to the second region 214 the cursor module 122 determines whether a stored cursor position ("stored position") 218 is available for the second region 214. The stored position 218, for instance, represents a previous known cursor position detected at the second region 214. For example, the stored position 218 is generated based on a previous user interaction with display content 132 presented at the second region 214. If the stored position 218 is not available the cursor module 122 determines a specified position 220 for the cursor 136 at the second region 214. The specified position 220, for example, represents a predetermined cursor position at the second region 214. The specified position 220 is determinable in various ways, such as based on a system setting of the operating system 110, an application setting of an application 116 that presents display content 132 in the second region 214, a user-defined cursor position, and so forth.

Accordingly, if the stored position 218 is available, the cursor module 122 causes a cursor reposition 222 to the stored position 218 at the second region 214. If the stored position 218 is not available the cursor module 122 causes the cursor reposition 222 to the specified position 220. For instance, based on the cursor reposition 222, the operating system 110 moves the cursor 136 to either the stored position 218 or the specified position 220 at the second region 214 of the display content 132. Generally, if a further focus change occurs from the second region 214 to the first region 210, the cursor position 216 is usable to perform a further cursor reposition from the second region 214 to the first region 210.

While different operations are discussed herein in the context of the glasses device 102, it is to be appreciated that at least some operations are performable by the client device 104 and/or cooperatively via interaction between the glasses device 102 and the client device 104. For instance, sensor data 128 from the sensors 118 is communicable to the client device 104 to enable the client device to track orientation of the glasses device 102 relative to display content 132 and to enable the client device 104 to identify changes in user focus relative to the display content 132.

Figure 3A:
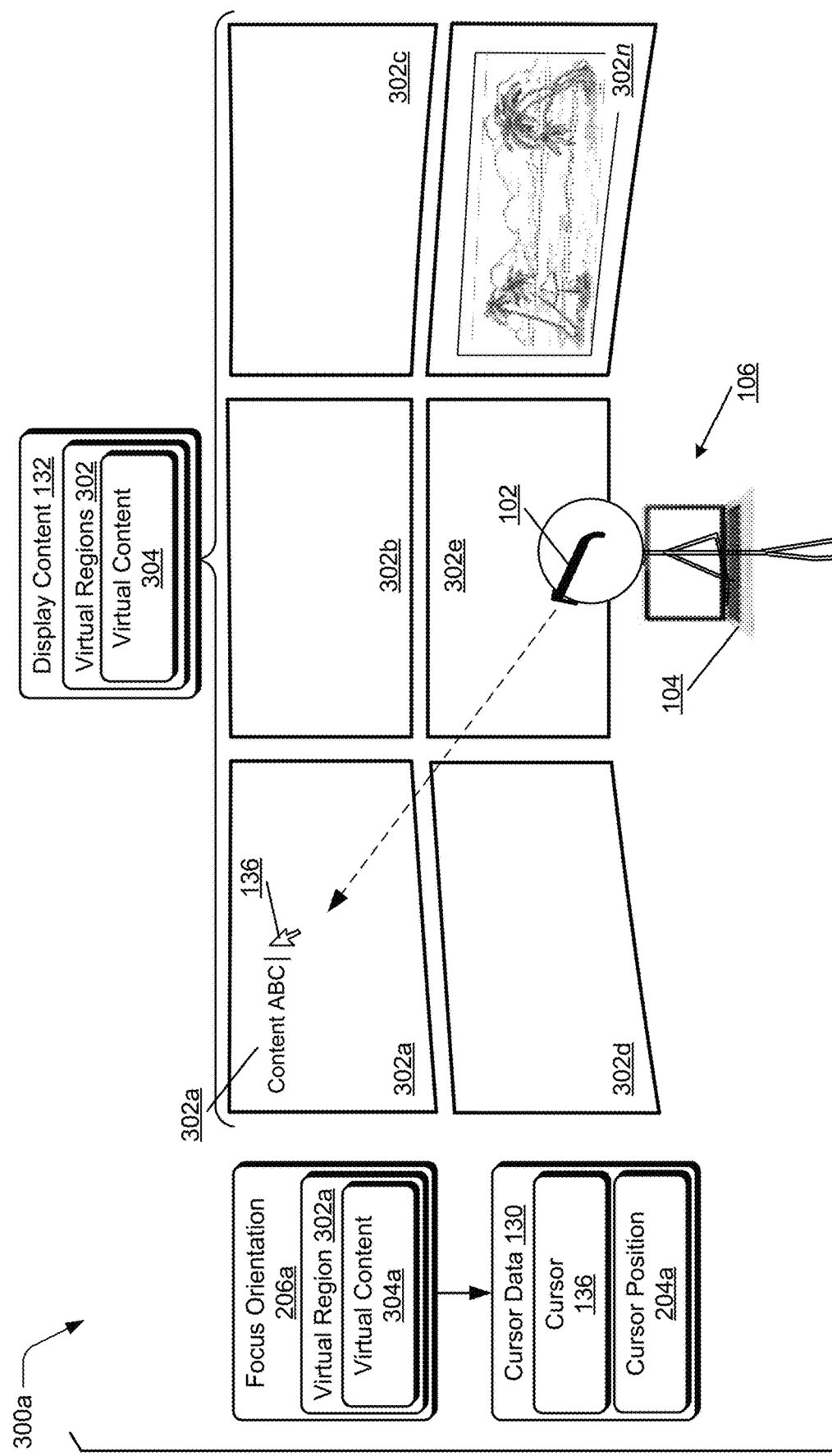
FIG. 3a depicts an example scenario for tracking cursor position in accordance with one or more implementations.

FIG. 3a depicts an example scenario 300a for tracking cursor position in accordance with one or more implementations. The scenario 300a illustrates display content 132 which in this example includes different virtual display regions ("virtual regions") 302 including virtual regions 302a, 302b, 302c, 302d, 302e, and 302n. The virtual regions 302, for instance, are displayed on the display devices 112 of the glasses device 102. Generally, the virtual regions 302 depicted in the scenario 300a and the following scenarios illustrate a perspective that the user 106 views when wearing the glasses device 102.

The virtual regions 302 are implementable in various ways, such as virtual display screens and/or virtual windows that are populatable with virtual content 304. For instance, a particular virtual region 302 is populatable with instances of virtual content 304, such as graphical user interfaces (GUIs) generated by applications 116 and content populated to the GUIs. Alternatively or additionally instances of the virtual regions 302 represent GUIs for the applications 116 themselves. Generally, the virtual content 304 represents different types of content such as productivity content, gaming content, web content, communication content, and so forth.

Further to the scenario 300a a focus orientation 206a of the glasses device 102 is determined, e.g., by the focus module 120. The focus orientation 206a, for instance, indicates that the glasses device 102 is oriented toward the virtual region 302a. Further, the virtual region 302a includes virtual content 304a and the cursor 136. The user 106, for instance, is interacting with the virtual content 304a displayed in the virtual region 302a. A cursor position 204a within the virtual region 302a is also determined and tracked as part of the cursor data 130. The cursor module 122, for instance, tracks different positions of the cursor 136 and stores the cursor position 204a as part of the cursor data 130.

In at least one implementation interaction with the virtual content 304 is at least partially enabled via the client device 104. For instance, instances of the virtual regions 302 and/or the virtual content 304 are generated by the client device 104 (e.g., the applications 140) and communicated to the glasses device 102 for display. Alternatively or additionally, input by the user 106 to the client device 104 is communicated to the glasses device 102 as part of interacting with the virtual content 304.

Figure 3B:
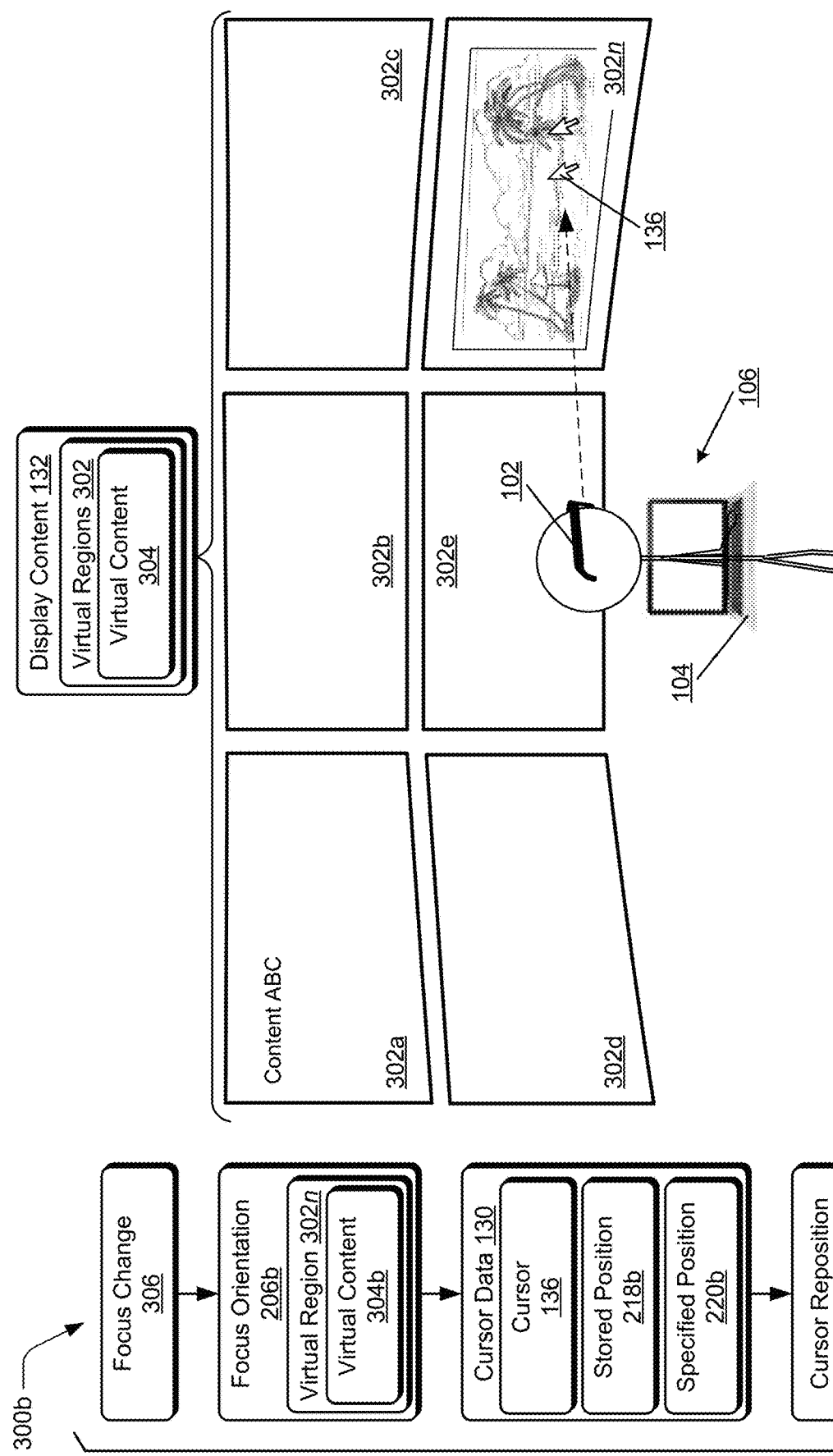
FIG. 3b depicts an example scenario for changing cursor position in accordance with one or more implementations.

FIG. 3b depicts an example scenario 300b for changing cursor position in accordance with one or more implementations. The scenario 300b, for instance, represents a continuation of the scenario 300a. In the scenario 300b a focus change 306 is detected indicating a change in orientation of the glasses device 102. The user 106, for instance, moves their head to a different position to focus on a different virtual region 302. The focus change 306 indicates a change to a focus orientation 206b which corresponds to a focus on the virtual region 302n with virtual content 304b. Accordingly, based on detecting the focus orientation 206b on the virtual region 302n, a determination is made whether a stored cursor position at the virtual region 302n is available.

In at least one implementation, a stored position 218b is available for repositioning the cursor 136. The stored position 218b, for instance, represents a previous cursor position that was detected and saved in conjunction with a previous user interaction with the virtual region 302n. Alternatively, if the stored position 218b is not available, a specified position 220b is identified as a cursor position for the virtual region 302n. As referenced previously, the specified position 220b is determinable in various ways, such as based on a system setting of the operating system 110, an application setting of an application 116 that presents the virtual content 304b in the virtual region 302n, a user-defined cursor position for the virtual content 304b and/or the virtual region 302n, and so forth.

Accordingly, a cursor reposition 308 is performed to reposition the cursor 136 into the virtual region 302n. The cursor reposition 308, for instance, includes automatically repositioning the cursor 136 from the virtual region 302a to the virtual region 302n. For example, if the stored position 218b is available, the cursor reposition 308 includes moving the cursor to the stored position 218b within the virtual region 302n. If the stored position 218b is not available, however, the cursor reposition 308 includes moving the cursor to the specified position 220b.

In at least one implementation a decision as to whether to reposition the cursor 136 to the stored position 218b or the specified position 220b is user customizable. For instance, a default setting of the cursor module 122 is to utilize the stored position 218b if available and if not, to utilize the specified position 220b. However, at least one implementation enables a user to override the default setting to indicate that the specified position 220b is to be utilized to reposition the cursor 136 even if the stored position 218b is available. The cursor module 122, for example, presents a settings GUI that enables various functionality of the cursor module 122 to be user customized, such as to specify whether to utilize a stored cursor position or a specified cursor position when repositioning the cursor 136. Consider, for example, the following scenarios.

Figure 4A:
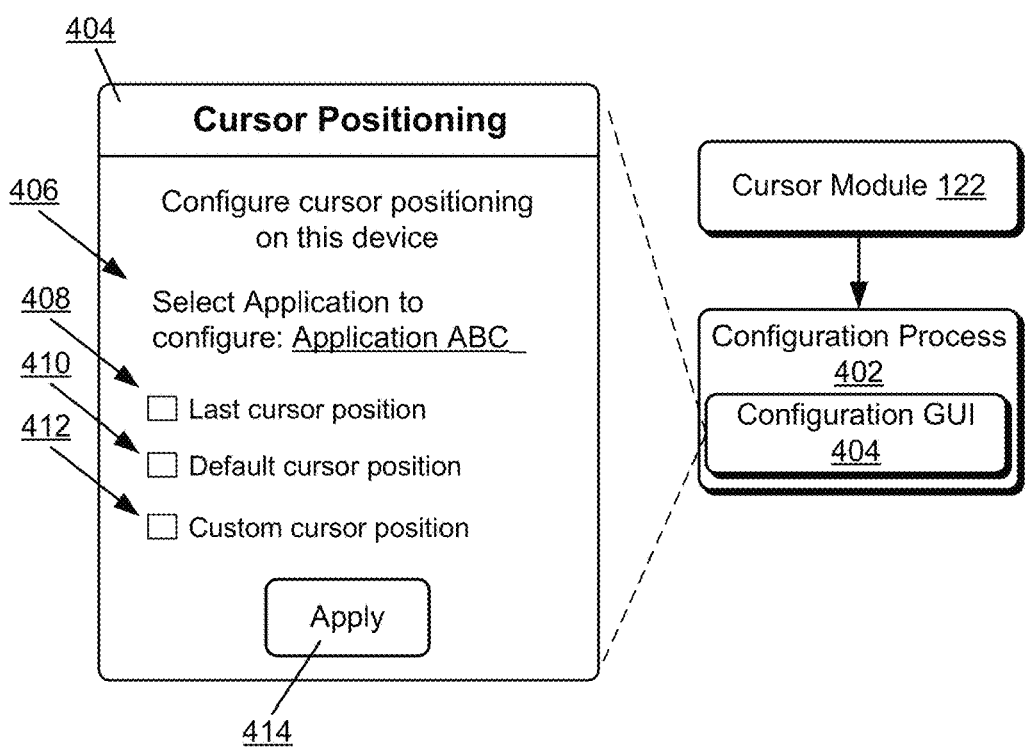
FIG. 4 depicts a scenario for enabling a user to configure cursor placement settings in accordance with one or more implementations.
FIG. 4b depicts a scenario for enabling custom cursor positioning in accordance with one or more implementations.

FIG. 4a depicts a scenario 400a for enabling a user to configure cursor placement settings in accordance with one or more implementations. In the scenario 400a the cursor module 122 performs a cursor configuration process 402 for enabling a user to configure cursor placement settings of the cursor module 122. The cursor placement settings configured via the configuration process 402, for example, are utilized to determine where to reposition a cursor as part of cursor repositioning such as discussed above. As part of the configuration process 402 the cursor module 122 presents a cursor configuration GUI 404, such as part of display content 132 displayed by the glasses device 102. The configuration GUI 404, for example, is presented in a particular virtual region 302 as part of the virtual content 304.

The configuration GUI 404 prompts a user to configure cursor positioning settings on the glasses device 102 and includes an application field 406 that enables a user to enter an application name for which to configure cursor settings. Different applications 116, for instance, are identifiable via the application field 406. Further, the configuration GUI 404 includes selectable cursor positioning settings for the application identified in the application field 406 including a last position setting 408, a default position setting 410, and a custom position setting 412. The last position setting 408 is selectable to utilize a last known cursor setting for positioning a cursor for the identified application, e.g., a stored position 218 for an application 116. The default position setting 410 is selectable to utilize a default cursor position for the identified application. A default cursor setting, for instance, is specified by instances of the applications 116 and/or by the operating system 110. The custom position setting 412 is selectable to enable a user to identify a custom cursor position for placing a cursor for the identified application.

The configuration GUI 404 also includes an apply control 414 which is selectable to apply configuration settings specified via the configuration GUI 404 to cursor settings of the cursor module 122. For instance, selecting the last position setting 408 and the apply control 414 causes cursor repositioning for the identified application to utilize a last known cursor position for the application. Further, selecting the default position setting 410 and the apply control 414 causes cursor repositioning for the identified application to utilize a default cursor position for the application. Selecting the custom position setting 412 and the apply control 414 causes a cursor positioning experience to be presented that enables a user to specify a custom cursor position for the identified application.

Figure 4B:
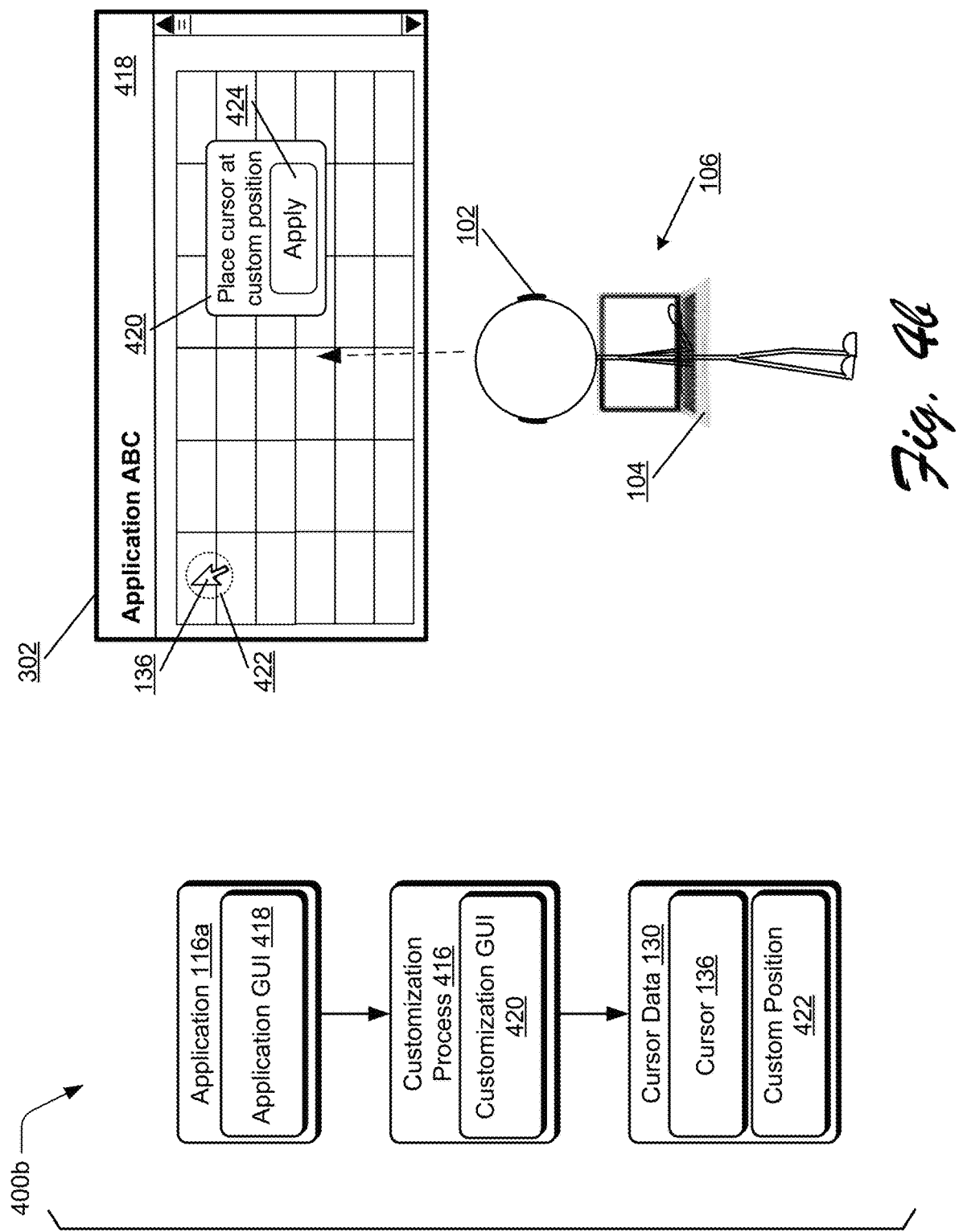

FIG. 4b depicts a scenario 400b for enabling custom cursor positioning in accordance with one or more implementations. The scenario 400b, for example, represents a continuation of the scenario 400a and is implementable in response to user selection of the custom position setting 412 and the apply control 414. In the scenario 400b the cursor module 122 performs a position customization process ("customization process") 416, such as part of the configuration process 402. The customization process 416, for instance, represents a cursor positioning experience that enables a user to specify a cursor position for cursor repositioning. In this particular example the customization process 416 is implemented for an application 116a, such as an application selected in the scenario 400a.

In conjunction with the customization process 416 an application GUI 418 is presented as part of a virtual region 302 displayed on the glasses device 102. Further, the cursor module 122 presents a customization GUI 420 that prompts the user 106 to position the cursor 136 at a position to be used in a repositioning of a cursor for the application 116. Accordingly, the user provides input to position the cursor 136 at a custom position 422 within the application GUI 418 and selects an apply control 424 to save the custom position 422 as a position for repositioning a cursor to the application GUI 418. The custom position 422, for example, is associated with the application 116a in the cursor data 130 for use as part of cursor repositioning for the application 116a, e.g., for the application GUI 418.

While the scenarios 400a, 400b are discussed in the context of specifying position settings for cursor repositioning for an application, implementations also enable position settings to be specified in other contexts, such as for specific virtual regions 302 and/or other implementations of display content 132 that are presentable via the glasses device 102.

Figure 5A:
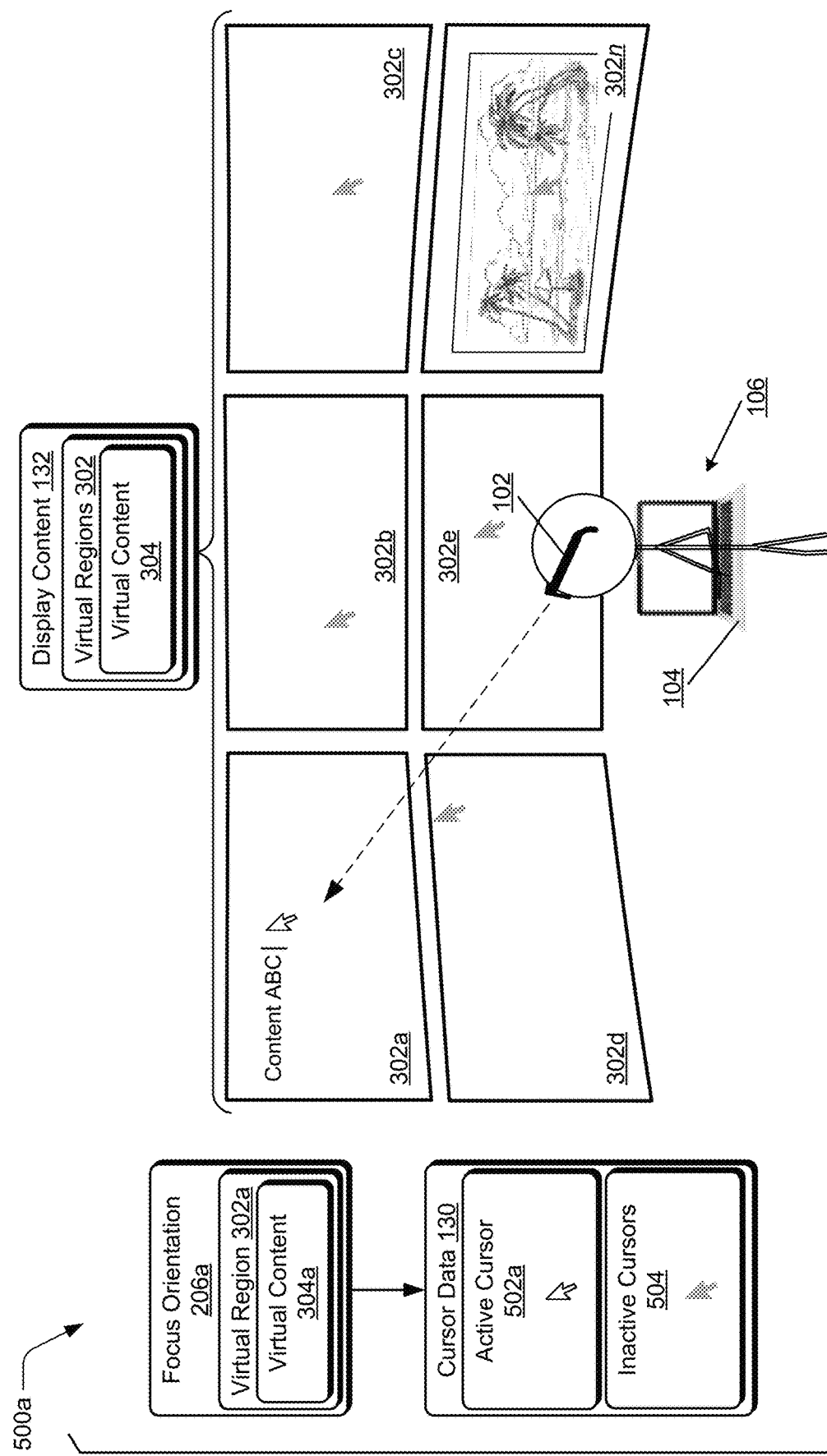
FIGS. 5a, 5b depict scenarios for utilizing multiple cursors in accordance with one or more implementations.
Figure 5B:
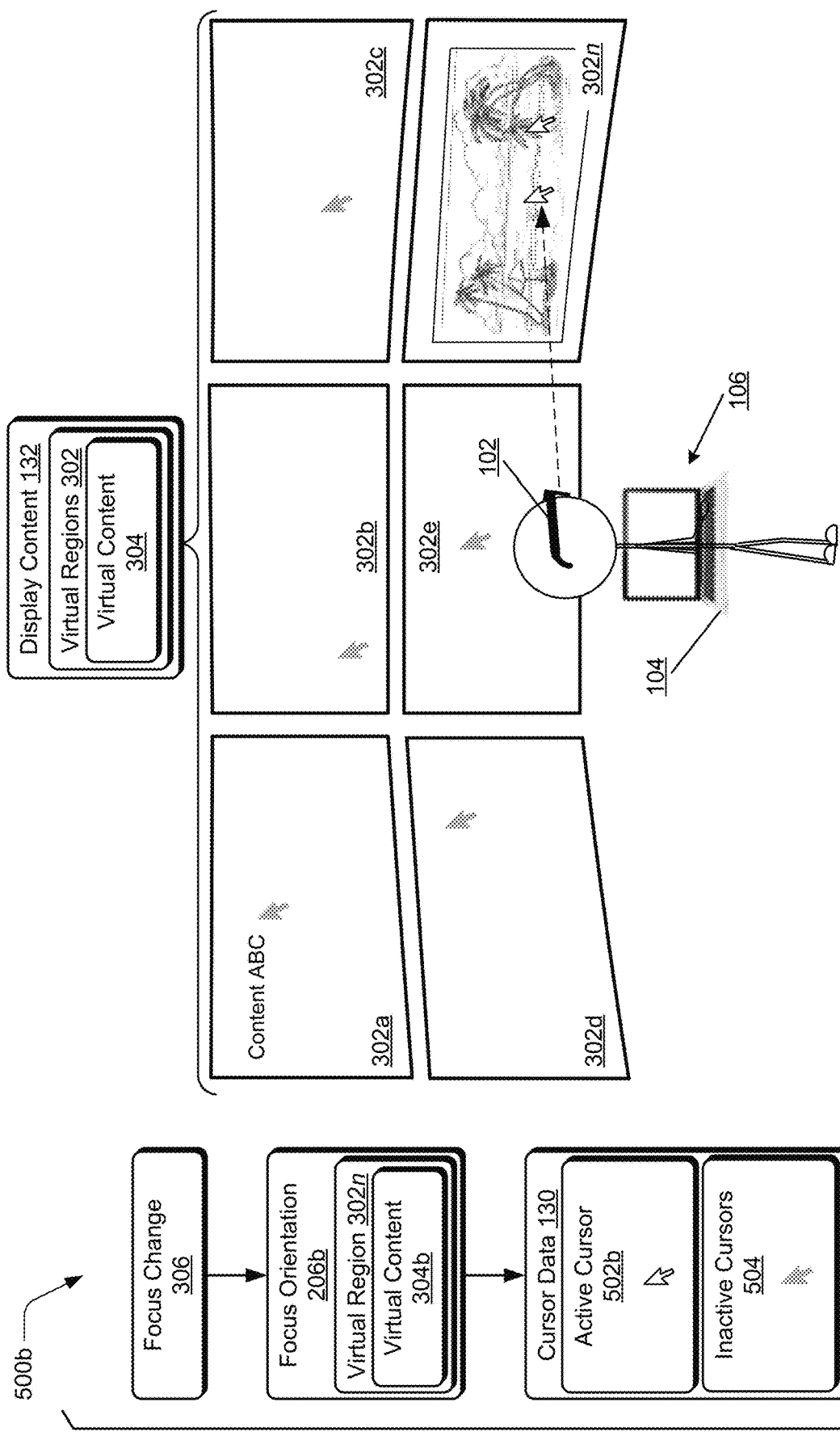

FIGS. 5a, 5b depict scenarios 500a, 500b for utilizing multiple cursors in accordance with one or more implementations. The scenarios 500a, 500b, for instance, represent an alternative or additional implementation for cursor position based on focus of a glasses device. In the scenario 500a the focus orientation 206a of the glasses device 102 is determined, e.g., by the focus module 120. The focus orientation 206a, for instance, determines that the glasses device 102 is oriented toward the virtual region 302a populated with the virtual content 304a. Further, the virtual region 302a includes an active cursor 502a and the other virtual regions 302 include inactive cursors 504. For instance, the virtual regions 302b-302n each include a respective inactive cursor 504. Generally, the active cursor 502a represents a cursor that is within a focus region of the glasses device 102 and that responds to user input from the user 106. The inactive cursors 504 represents cursors that are outside of a focus region of the glasses device 102 and that do not respond to user input while the glasses device 102 is focused on the virtual region 302a. In at least one implementation the inactive cursors 504 are visually differentiated from the active cursor 502a. As illustrated in the scenario 500a, for example, the inactive cursors 504 are displayed with a different color and/or shading than the active cursor 502a.

The scenario 500b depicts a scenario for activating an inactive cursor in response to a change in user focus. The scenario 500b, for instance, represents a continuation of the scenario 500a. In the scenario 500b the focus change 306 is detected indicating a change in orientation of the glasses device 102. The user 106, for instance, moves their head to a different position to focus on a different virtual region 302. The focus change 306 indicates a change to the focus orientation 206b which corresponds to a focus on the virtual region 302n with virtual content 304b.

Accordingly, based on detecting the focus orientation 206b on the virtual region 302n, the active cursor 502a is deactivated to an inactive cursor 504 and an inactive cursor in the virtual region 302n is activated to an active cursor 502b. Accordingly, the active cursor 502b is active to respond to user input while the inactive cursors 504 do not respond to user input while the glasses device 102 is focused on the virtual region 302n. Generally, each of the inactive cursors 504 is activatable in response to detecting focus on the glasses device 102 on a respective virtual region 302.

Thus, the scenarios 500a, 500b illustrate that multiple different cursors are simultaneously maintainable and can be activated and deactivated based on changes in user focus. In at least one implementation a single active cursor 502 is maintained at a particular time with other cursors being maintained in an inactive state as the inactive cursors 504.

Figure 6:
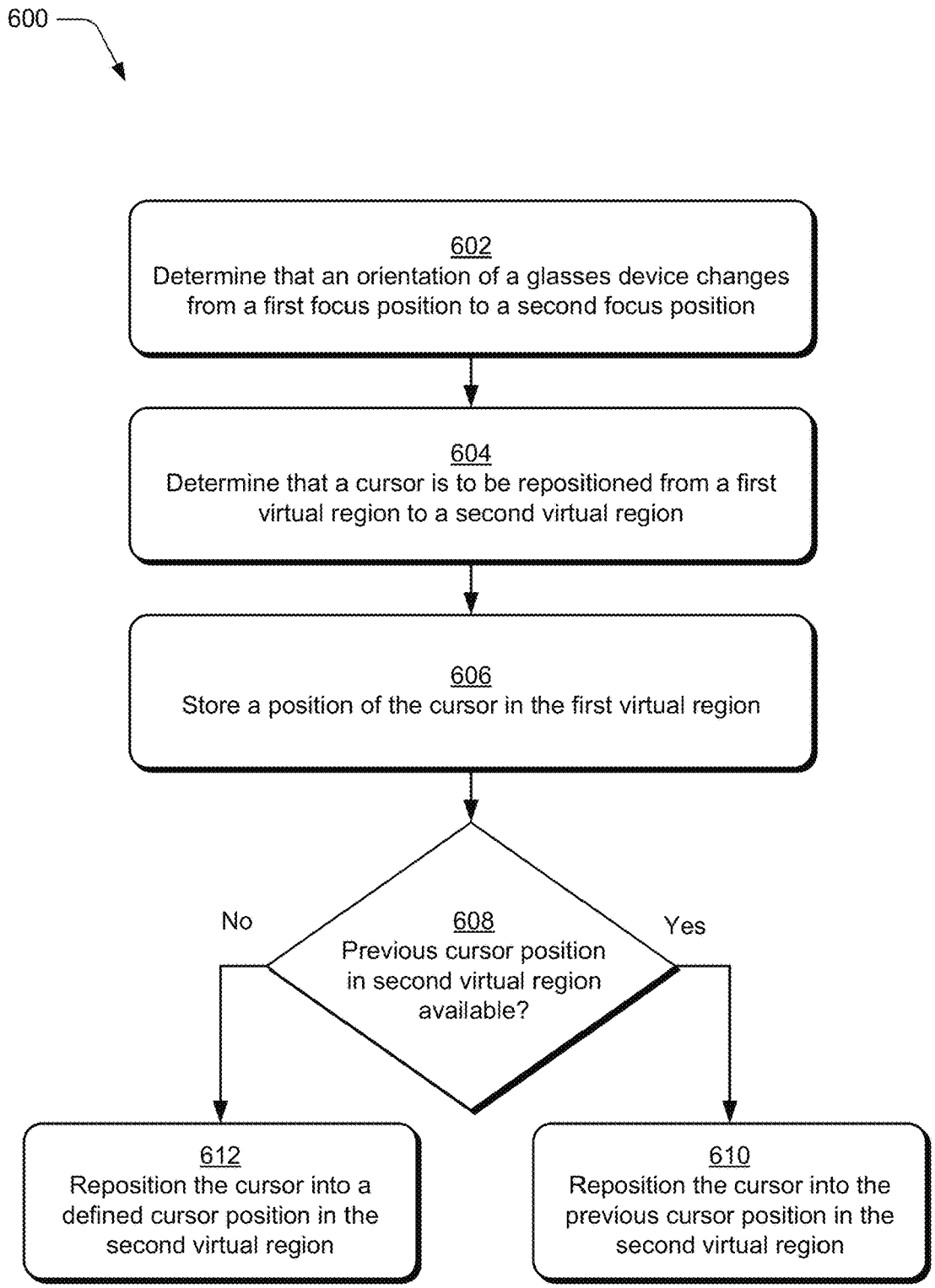
FIG. 6 illustrates a flow chart depicting an example method for cursor repositioning for a glasses device in accordance with one or more implementations.

FIG. 6 illustrates a flow chart depicting an example method 600 for cursor repositioning for a glasses device in accordance with one or more implementations. At 602 it is determined that an orientation of a glasses device changes from a first focus position to a second focus position. The cursor module 122, for instance, determines that an orientation of the glasses device 102 changes from a first focus position relative to a first virtual region displayed by the glasses device 102 to a second focus position relative to a second virtual region displayed by the glasses device 102. In at least one implementation the change in focus position is based on detecting a change in physical orientation (e.g., a change in 3D orientation) of the glasses device.

At 604 it is determined that a cursor is to be repositioned from a first virtual region to a second virtual region. For instance, the cursor is positioned in the first virtual region and the cursor module 122 determines that based on the change in focus position to the second virtual region, the cursor is to be repositioned to the second virtual region. At 606 a position of the cursor in the first virtual region is stored. The cursor module 122, for example, stores a position of the cursor in the first virtual region in conjunction with determining that the cursor is to be repositioned to a different virtual region. Generally, this enables the cursor to be repositioned to the stored position if a focus position of the glasses device 102 returns to the first virtual region.

At 608 it is determining whether a previous cursor position of the cursor in the second virtual region is available. The cursor module 122, for example, determines whether the sensor data 128 includes a stored cursor position for a cursor in the second virtual region. Alternatively or additionally the cursor module 122 determines whether a setting of the cursor module 122 indicates to use a stored cursor position or to user a different cursor position for cursor repositioning, e.g., a defined cursor position.

If a previous cursor position of the cursor in the second virtual region is available ("Yes"), at 610 the cursor is repositioned into the previous cursor position in the second virtual region. For instance, the cursor module 122 identifies a stored cursor position for the second virtual region and causes the cursor to be repositioned at the stored cursor position. If a previous cursor position of the cursor in the second virtual region is not available ("No"), at 612 the cursor is repositioned into a defined cursor position in the second virtual region. Different types and instances of defined cursor positions are described above. In at least one implementation, when a setting of the cursor module 122 is configured to specify that a defined cursor position is to be used instead of a previous cursor position, the stored cursor position is determined to be unavailable and thus a defined cursor position is utilized for cursor repositioning.

Generally, the method 600 is performable dynamically to reposition a cursor based on changes in focus position to different virtual regions displayed on the glasses device 102.

Figure 7:
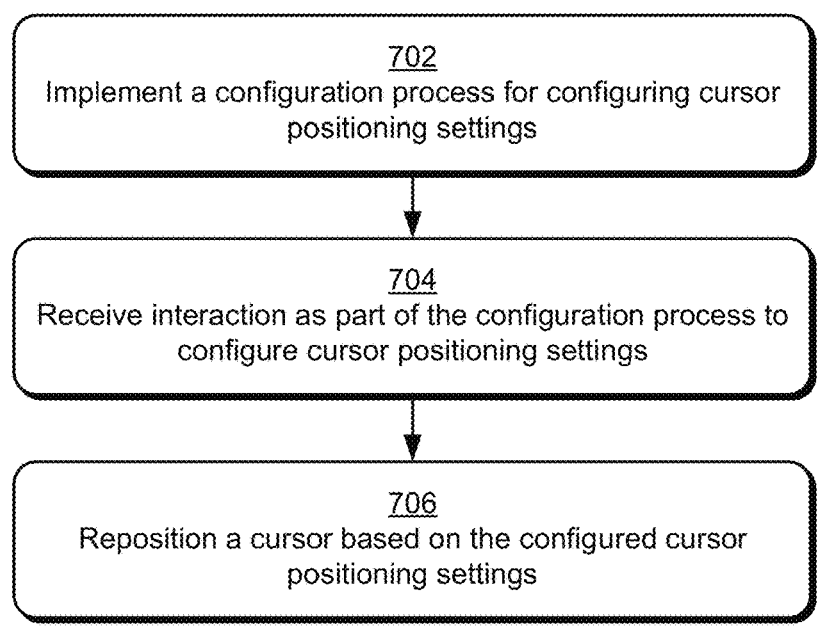
FIG. 7 illustrates a flow chart depicting an example method for configuring cursor repositioning settings for a glasses device in accordance with one or more implementations.

FIG. 7 illustrates a flow chart depicting an example method 700 for configuring cursor repositioning settings for a glasses device in accordance with one or more implementations. The method 700, for instance, enables cursor positioning settings of the cursor module 122 to be configured. At 702 a configuration process is implemented for configuring cursor positioning settings. The cursor module 122, for example, implements the configuration process 402 for enabling a user to configure various settings for cursor repositioning. In at least one implementation the configuration process enables selection of whether to use a previous cursor position or a defined cursor position for repositioning a cursor.

At 704 interaction is received as part of the configuration process to configure cursor positioning settings. The cursor module 122, for instance, detects user input to the configuration GUI 404 to configure cursor positioning settings. The user input, for example, selects to use a previous cursor position or a defined cursor position for repositioning a cursor. For instance, in an implementation where a user selects to utilize a defined cursor position for cursor repositioning, this causes the previous cursor position to be not available for cursor repositioning. At 706 a cursor is repositioned based on the configured cursor positioning settings. For instance, when the configured positioning settings indicate whether to use a previous cursor position or a defined cursor position for repositioning, a cursor is repositioned to the selected cursor position.

FIG. 8 illustrates a flow chart depicting an example method 800 for user selection of a defined cursor location in accordance with one or more implementations. The method 800, for example, is implemented in conjunction with the method 700 such as part of a configuration process for configuring cursor positioning settings. At 802 interaction is received to position a cursor at a particular location in a virtual region. The cursor module 122, for example, detects that a user positions a cursor in a virtual region displayed by the glasses device 102. In at least one implementation the user positions the cursor in a GUI of an application 116.

At 804 the particular location is stored as a defined cursor position for the virtual region. For instance, when user focus is placed on the virtual region a cursor is repositioned to the defined cursor position. In at least one implementation the defined cursor position is associated with an application GUI of a particular application 116 and thus when the application GUI is presented within the virtual region and user focus is positioned on the virtual region, a cursor is positioned at the defined cursor position within the application GUI.

Figure 9:
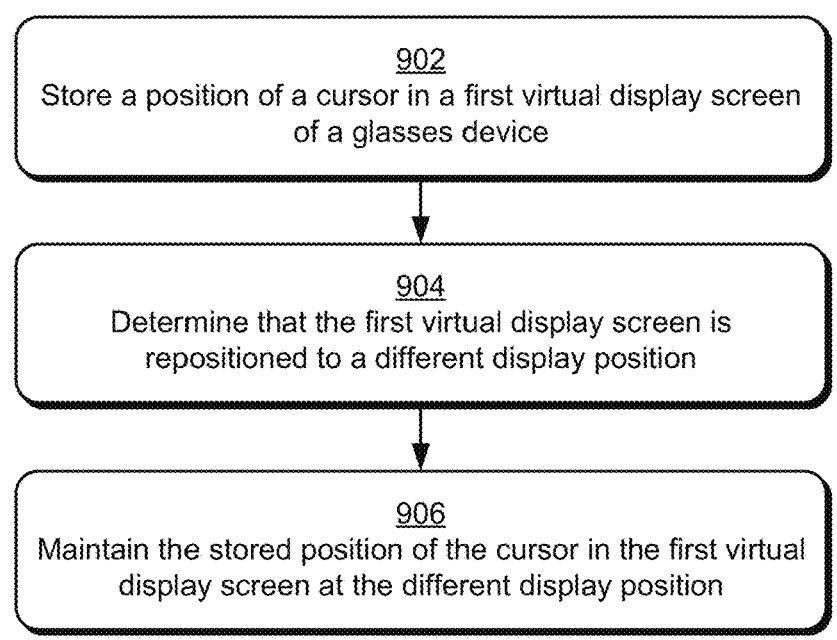
FIG. 9 illustrates a flow chart depicting an example method for maintaining a stored cursor position based on repositioning of a virtual display screen in accordance with one or more implementations.

FIG. 9 illustrates a flow chart depicting an example method 900 for maintaining a stored cursor position based on repositioning of a virtual display screen in accordance with one or more implementations. At 902 a position is stored of a cursor in a first virtual display screen of a glasses device. As discussed above, for instance, a virtual region 302 is implementable as a virtual display screen that is populatable with various virtual content, such as a GUI for an application. In at least one implementation the position of the cursor in the first virtual display screen is stored in conjunction with determining that the cursor is to be repositioned from the first virtual display screen to a second virtual display screen.

At 904 it is determined that the first virtual display screen is repositioned to a different display position. Generally, various actions can cause the first virtual display screen to be repositioned, such as user input to move the virtual display screen to a different position, a new virtual display screen being added for display by the glasses device 102, a removal of an existing virtual display screen from display on the glasses device 102, and so forth.

At 906 the stored position of the cursor is maintained in the first virtual display screen at the different display position. For instance, the stored cursor position relative to the first virtual display screen is maintained when the first virtual display screen is repositioned. Generally, this enables the cursor to be repositioned to the stored position if user focus is detected on the first virtual display screen.

Figure 10:
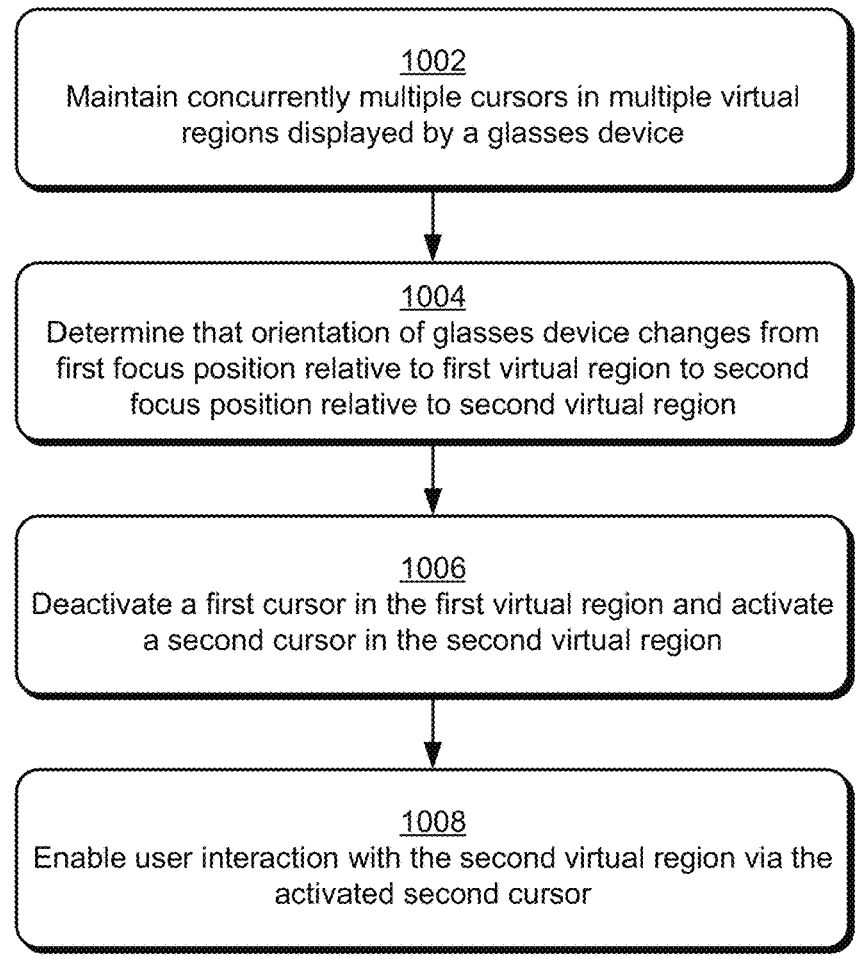
FIG. 10 illustrates a flow chart depicting an example method for maintaining multiple cursors for multiple virtual regions of a glasses device in accordance with one or more implementations.

FIG. 10 illustrates a flow chart depicting an example method 1000 for maintaining multiple cursors for multiple virtual regions of a glasses device in accordance with one or more implementations. At 1002 multiple cursors in multiple virtual regions displayed by a glasses device are concurrently maintained. The multiple cursors, for instance, include an active cursor in a particular virtual region and inactive cursors in other virtual regions. In at least one implementation the inactive cursors are maintained in static positions in their respective virtual regions. Further, at least some of the inactive cursors are displayable in an inactive state.

At 1004 it is determined that an orientation of the glasses device changes from a first focus position relative to a first virtual region to a second focus position relative to a second virtual region. The cursor module 122, for instance, detects that focus of the glasses device 102 changes from a first virtual region to a second virtual region. At 1006 a first cursor of the multiple cursors in the first virtual region is deactivated and a second cursor of the multiple cursors in the second virtual region is activated. For example, based on detecting the change in focus to the second virtual region, the cursor module deactivates a cursor in the first virtual region and activates a different cursor in the second virtual region.

At 1008 user interaction with the second virtual region via the activated second cursor is enabled. A user, for instance, is able to interact with the second virtual region via manipulation of the activated cursor.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 11:
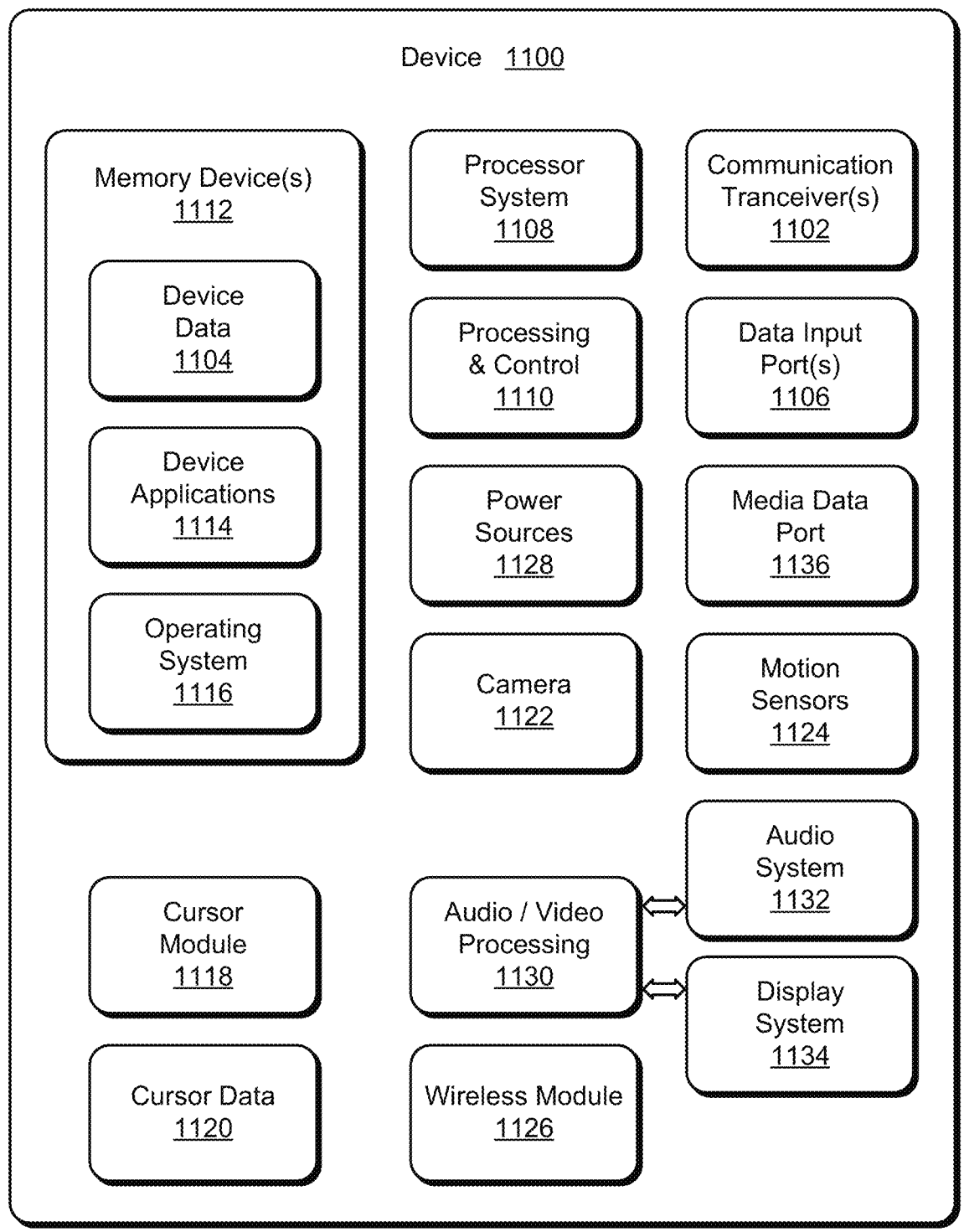
FIG. 11 illustrates various components of an example device in which aspects of cursor position based on focus of a glasses device can be implemented in accordance with one or more implementations.

FIG. 11 illustrates various components of an example device 1100 in which aspects of cursor position based on focus of a glasses device can be implemented. The example device 1100 can be implemented as any of the devices described with reference to the previous FIGS. 1-10, such as any type of mobile device, mobile phone, mobile device, wearable device, tablet, computing, communication, entertainment, gaming, media playback, and/or other type of electronic device. For example, the glasses device 102 and/or the client device 104 as shown and described with reference to FIGS. 1-10 may be implemented as the example device 1100.

The device 1100 includes communication transceivers 1102 that enable wired and/or wireless communication of device data 1104 with other devices. The device data 1104 can include any of device identifying data, device location data, wireless connectivity data, and wireless protocol data. Additionally, the device data 1104 can include any type of audio, video, and/or image data. Example communication transceivers 1102 include wireless personal area network (WPAN) radios compliant with various IEEE 1102.15 (Bluetooth™) standards, wireless local area network (WLAN) radios compliant with any of the various IEEE 1102.11 (Wi-Fi™) standards, wireless wide area network (WWAN) radios for cellular phone communication, wireless metropolitan area network (WMAN) radios compliant with various IEEE 1102.16 (WiMAX™) standards, and wired local area network (LAN) Ethernet transceivers for network data communication.

The device 1100 may also include one or more data input ports 1106 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1100 includes a processing system 1108 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1110. The device 1100 may further include any type of a system bus or other data and command transfer system that couples the various components within the device. A system bus can include any one or combination of different bus structures and architectures, as well as control and data lines.

The device 1100 also includes computer-readable storage memory 1112 (e.g., memory devices) that enable data storage, such as data storage devices that can be accessed by a computing device, and that provide persistent storage of data and executable instructions (e.g., software applications, programs, functions, and the like). Examples of the computer-readable storage memory 1112 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1100 may also include a mass storage media device.

The computer-readable storage memory 1112 provides data storage mechanisms to store the device data 1104, other types of information and/or data, and various device applications 1114 (e.g., software applications). For example, an operating system 1116 can be maintained as software instructions with a memory device and executed by the processing system 1108. The device applications may also include a device manager, such as any form of a control application, software application, signal-processing and control module, code that is native to a particular device, a hardware abstraction layer for a particular device, and so on. Computer-readable storage memory 1112 represents media and/or devices that enable persistent and/or non-transitory storage of information in contrast to mere signal transmission, carrier waves, or signals per se. Computer-readable storage memory 1112 do not include signals per se or transitory signals.

In this example, the device 1100 includes a cursor module 1118 that implements aspects of cursor position based on focus of a glasses device and may be implemented with hardware components and/or in software as one of the device applications 1114. For example, the cursor module 1118 can be implemented as the cursor module 122 described in detail above. In implementations, the cursor module 1118 may include independent processing, memory, and logic components as a computing and/or electronic device integrated with the device 1100. The device 1100 also includes cursor data 1120 for implementing aspects of cursor position based on focus of a glasses device and may include data from the cursor module 1118, such as data for determining changes in focus of the glasses device 102 and for determining cursor positioning for repositioning a cursor.

In this example, the example device 1100 also includes a camera 1122 and motion sensors 1124, such as may be implemented in an inertial measurement unit (IMU). The motion sensors 1124 can be implemented with various sensors, such as a gyroscope, an accelerometer, and/or other types of motion sensors to sense motion of the device. The various motion sensors 1124 may also be implemented as components of an inertial measurement unit in the device.

The device 1100 also includes a wireless module 1126, which is representative of functionality to perform various wireless communication tasks. The device 1100 can also include one or more power sources 1128, such as when the device is implemented as a mobile device. The power sources 1128 may include a charging and/or power system, and can be implemented as a flexible strip battery, a rechargeable battery, a charged super-capacitor, and/or any other type of active or passive power source.

The device 1100 also includes an audio and/or video processing system 1130 that generates audio data for an audio system 1132 and/or generates display data for a display system 1134. The audio system and/or the display system may include any devices that process, display, and/or otherwise render audio, video, display, and/or image data.

Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1136. In implementations, the audio system and/or the display system are integrated components of the example device. Alternatively, the audio system and/or the display system are external, peripheral components to the example device.

Although implementations of cursor position based on focus of a glasses device have been described in language specific to features and/or methods, the subject of the appended claims is not necessarily limited to the specific features or methods described. Rather, the features and methods are disclosed as example implementations, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In addition to the previously described methods, any one or more of the following:

In some aspects, the techniques described herein relate to a glasses device including: one or more display devices positioned to display content from an internal perspective of the glasses device; one or more sensors for determining orientation of the glasses device; and one or more modules implemented at least in part in hardware of the glasses device to: determine that an orientation of the glasses device changes from a first focus position relative to a first virtual region displayed on the one or more display devices to a second focus position relative to a second virtual region displayed on the one or more display devices; determine that a cursor is to be repositioned from the first virtual region to the second virtual region; determine whether a previous cursor position of the cursor in the second virtual region is available; and reposition the cursor into the second virtual region including to: reposition the cursor into the previous cursor position in the second virtual region in an event that the previous cursor position the in second virtual region is available; and reposition the cursor into a defined cursor position in the second virtual region in an event that the previous cursor position in the second virtual region is not available.

In some aspects, the techniques described herein relate to a glasses device, wherein the first virtual region includes a first virtual display screen displayed by the glasses device and the second virtual region includes a second virtual display screen displayed by the glasses device.

In some aspects, the techniques described herein relate to a glasses device, wherein the first virtual region includes a first application window displayed by the glasses device and the second virtual region includes a second application window displayed by the glasses device.

In some aspects, the techniques described herein relate to a glasses device, wherein the one or more modules are further implemented to store a position of the cursor in the first virtual region in conjunction with to determine that the cursor is to be repositioned from the first virtual region to the second virtual region.

In some aspects, the techniques described herein relate to a glasses device, wherein the one or more modules are implemented to determine that the previous cursor position of the cursor in the second virtual region is available, the previous cursor position representing a previous location of user interaction with the second virtual region.

In some aspects, the techniques described herein relate to a glasses device, wherein the one or more modules are further implemented to: store a position of the cursor in the first virtual region in conjunction with to determine that the cursor is to be repositioned from the first virtual region to the second virtual region; determine that an orientation of the glasses device changes from the second focus position relative to the second virtual region to the first focus position relative to the first virtual region; and reposition the cursor from the second virtual region to the stored position in the first virtual region.

In some aspects, the techniques described herein relate to a glasses device, wherein the first virtual region includes a first virtual display screen displayed by the glasses device and the second virtual region includes a second virtual display screen displayed by the glasses device, wherein the one or more modules are further implemented to: store a position of the cursor in the first virtual display screen in conjunction with to determine that the cursor is to be repositioned from the first virtual region to the second virtual region; determine that the first virtual display screen is repositioned to a different display position based on one of user input to move the first virtual display screen to the different display position, an addition of a new virtual display screen for display by the glasses device, or a removal of an existing virtual display screen from display on the glasses device; and maintain the stored position of the cursor in the first virtual display screen at the different display position.

In some aspects, the techniques described herein relate to a glasses device, wherein the one or more modules are further implemented to: implement a configuration process that enables selection of whether to use the previous cursor position or the defined cursor position for repositioning the cursor; receive interaction as part of the configuration process to select to use the previous cursor position or the defined cursor position for repositioning the cursor; and reposition the cursor into the second virtual region based on the interaction as part of the configuration process.

In some aspects, the techniques described herein relate to a glasses device, wherein to receive the interaction as part of the configuration process includes to: receive a selection of an application to be associated with the configuration process; receive interaction to specify a particular location within a graphical user interface of the application as the defined cursor position; and store the particular location within the graphical user interface as the defined cursor position for the application.

In some aspects, the techniques described herein relate to a method, including: determining that an orientation of a glasses device changes from a first focus position relative to a first virtual region displayed by the glasses device to a second focus position relative to a second virtual region displayed by the glasses device; determining that a cursor is to be repositioned from the first virtual region to the second virtual region; determining whether a previous cursor position of the cursor in the second virtual region is available; and repositioning the cursor into the second virtual region including: repositioning the cursor into the previous cursor position in the second virtual region in an event that the previous cursor position the in second virtual region is available; or repositioning the cursor into a defined cursor position in the second virtual region in an event that the previous cursor position in the second virtual region is not available.

In some aspects, the techniques described herein relate to a method, further including storing a position of the cursor in the first virtual region in conjunction with determining that the cursor is to be repositioned from the first virtual region to the second virtual region.

In some aspects, the techniques described herein relate to a method, further including determining that the previous cursor position of the cursor in the second virtual region is available, the previous cursor position representing a previous location of user interaction with the second virtual region.

In some aspects, the techniques described herein relate to a method, further including: storing a position of the cursor in the first virtual region in conjunction with determining that the cursor is to be repositioned from the first virtual region to the second virtual region; determining that an orientation of the glasses device changes from the second focus position relative to the second virtual region to the first focus position relative to the first virtual region; and repositioning the cursor from the second virtual region to the stored position in the first virtual region.

In some aspects, the techniques described herein relate to a method, wherein the first virtual region includes a first virtual display screen displayed by the glasses device and the second virtual region includes a second virtual display screen displayed by the glasses device, wherein the method further includes: storing a position of the cursor in the first virtual display screen in conjunction with determining that the cursor is to be repositioned from the first virtual region to the second virtual region; determining that the first virtual display screen is repositioned to a different display position based on one of user input to move the first virtual display screen to the different display position, an addition of a new virtual display screen for display by the glasses device, or a removal of an existing virtual display screen from display on the glasses device; and maintaining the stored position of the cursor in the first virtual display screen at the different display position.

In some aspects, the techniques described herein relate to a method, further including: implementing a configuration process that enables selection of whether to use the previous cursor position or the defined cursor position for repositioning the cursor; receiving interaction as part of the configuration process to select to use the previous cursor position or the defined cursor position for repositioning the cursor; and repositioning the cursor into the second virtual region based on the interaction as part of the configuration process.

In some aspects, the techniques described herein relate to a method, wherein the receiving interaction as part of the configuration process further includes receiving an identification of an application to be associated with the configuration process.

In some aspects, the techniques described herein relate to a method, wherein the receiving interaction as part of the configuration process includes receiving an indication of a selection to use the defined cursor position, the method further including: receiving interaction to position the cursor at a particular location in the second virtual region; and stoning the particular location as the defined cursor position for the second virtual region.

In some aspects, the techniques described herein relate to a system including: one or more processors implemented at least partially in hardware; and one or more computer-readable storage media storing instructions that are executable by the one or more processors to: maintain concurrently multiple cursors in multiple virtual regions displayed by a glasses device; determine that an orientation of the glasses device changes from a first focus position relative to a first virtual region to a second focus position relative to a second virtual region; deactivate a first cursor of the multiple cursors in the first virtual region and activate a second cursor of the multiple cursors in the second virtual region; and enable user interaction with the second virtual region via the activated second cursor.

In some aspects, the techniques described herein relate to a system, wherein the instructions are further executable by the one or more processors to maintain multiple static cursors in at least some of the multiple virtual regions.

In some aspects, the techniques described herein relate to a system, wherein the instructions are further executable by the one or more processors to maintain the multiple static cursors in static positions in the at least some of the multiple virtual regions.

The invention claimed is:

1. A glasses device comprising:
   one or more display devices positioned to display content from an internal perspective of the glasses device;
   one or more sensors for determining orientation of the glasses device; and
   one or more modules implemented at least in part in hardware of the glasses device to:
      determine that an orientation of the glasses device changes from a first focus position relative to a first virtual region displayed on the one or more display devices to a second focus position relative to a second virtual region displayed on the one or more display devices;
      determine that a cursor is to be repositioned from the first virtual region to the second virtual region;
      determine whether a previous cursor position of the cursor in the second virtual region is available; and
      reposition the cursor into the second virtual region including to:
         reposition the cursor into the previous cursor position in the second virtual region in an event that the previous cursor position the in second virtual region is available; and
         reposition the cursor into a defined cursor position in the second virtual region in an event that the previous cursor position in the second virtual region is not available.

2. The glasses device as recited in claim 1, wherein the first virtual region comprises a first virtual display screen displayed by the glasses device and the second virtual region comprises a second virtual display screen displayed by the glasses device.

3. The glasses device as recited in claim 1, wherein the first virtual region comprises a first application window displayed by the glasses device and the second virtual region comprises a second application window displayed by the glasses device.

4. The glasses device as recited in claim 1, wherein the one or more modules are further implemented to store a position of the cursor in the first virtual region in conjunction with to determine that the cursor is to be repositioned from the first virtual region to the second virtual region.

5. The glasses device as recited in claim 1, wherein the one or more modules are implemented to determine that the previous cursor position of the cursor in the second virtual region is available, the previous cursor position representing a previous location of user interaction with the second virtual region.

6. The glasses device as recited in claim 1, wherein the one or more modules are further implemented to:
  store a position of the cursor in the first virtual region in conjunction with to determine that the cursor is to be repositioned from the first virtual region to the second virtual region;
  determine that an orientation of the glasses device changes from the second focus position relative to the second virtual region to the first focus position relative to the first virtual region; and
  reposition the cursor from the second virtual region to the stored position in the first virtual region.

7. The glasses device as recited in claim 1, wherein the first virtual region comprises a first virtual display screen displayed by the glasses device and the second virtual region comprises a second virtual display screen displayed by the glasses device, wherein the one or more modules are further implemented to:
  store a position of the cursor in the first virtual display screen in conjunction with to determine that the cursor is to be repositioned from the first virtual region to the second virtual region;
  determine that the first virtual display screen is repositioned to a different display position based on one of user input to move the first virtual display screen to the different display position, an addition of a new virtual display screen for display by the glasses device, or a removal of an existing virtual display screen from display on the glasses device; and
  maintain the stored position of the cursor in the first virtual display screen at the different display position.

8. The glasses device as recited in claim 1, wherein the one or more modules are further implemented to:
  implement a configuration process that enables selection of whether to use the previous cursor position or the defined cursor position for repositioning the cursor;
  receive interaction as part of the configuration process to select to use the previous cursor position or the defined cursor position for repositioning the cursor; and
  reposition the cursor into the second virtual region based on the interaction as part of the configuration process.

9. The glasses device as recited in claim 8, wherein to receive the interaction as part of the configuration process comprises to:
  receive a selection of an application to be associated with the configuration process;
  receive interaction to specify a particular location within a graphical user interface of the application as the defined cursor position; and
  store the particular location within the graphical user interface as the defined cursor position for the application.

10. A method, comprising:
  determining that an orientation of a glasses device changes from a first focus position relative to a first virtual region displayed by the glasses device to a second focus position relative to a second virtual region displayed by the glasses device;
  determining that a cursor is to be repositioned from the first virtual region to the second virtual region;
  determining whether a previous cursor position of the cursor in the second virtual region is available; and
  repositioning the cursor into the second virtual region including:
    repositioning the cursor into the previous cursor position in the second virtual region in an event that the previous cursor position the in second virtual region is available; or
    repositioning the cursor into a defined cursor position in the second virtual region in an event that the previous cursor position in the second virtual region is not available.

11. The method as recited in claim 10, further comprising storing a position of the cursor in the first virtual region in conjunction with determining that the cursor is to be repositioned from the first virtual region to the second virtual region.

12. The method as recited in claim 10, further comprising determining that the previous cursor position of the cursor in the second virtual region is available, the previous cursor position representing a previous location of user interaction with the second virtual region.

13. The method as recited in claim 10, further comprising:
  storing a position of the cursor in the first virtual region in conjunction with determining that the cursor is to be repositioned from the first virtual region to the second virtual region;
  determining that an orientation of the glasses device changes from the second focus position relative to the second virtual region to the first focus position relative to the first virtual region; and
  repositioning the cursor from the second virtual region to the stored position in the first virtual region.

14. The method as recited in claim 10, wherein the first virtual region comprises a first virtual display screen displayed by the glasses device and the second virtual region comprises a second virtual display screen displayed by the glasses device, wherein the method further comprises:
  storing a position of the cursor in the first virtual display screen in conjunction with determining that the cursor is to be repositioned from the first virtual region to the second virtual region;
  determining that the first virtual display screen is repositioned to a different display position based on one of user input to move the first virtual display screen to the different display position, an addition of a new virtual display screen for display by the glasses device, or a removal of an existing virtual display screen from display on the glasses device; and
  maintaining the stored position of the cursor in the first virtual display screen at the different display position.

15. The method as recited in claim 10, further comprising:
  implementing a configuration process that enables selection of whether to use the previous cursor position or the defined cursor position for repositioning the cursor;
  receiving interaction as part of the configuration process to select to use the previous cursor position or the defined cursor position for repositioning the cursor; and
  repositioning the cursor into the second virtual region based on the interaction as part of the configuration process.

16. The method as recited in claim 15, wherein said receiving interaction as part of the configuration process further comprises receiving an identification of an application to be associated with the configuration process.

17. The method as recited in claim 15, wherein said receiving interaction as part of the configuration process comprises receiving an indication of a selection to use the defined cursor position, the method further comprising:
  receiving interaction to position the cursor at a particular location in the second virtual region; and storing the particular location as the defined cursor position for the second virtual region.

18. A system comprising:

one or more processors implemented at least partially in hardware; and one or more computer-readable storage media storing instructions that are executable by the one or more processors to:

maintain concurrently multiple cursors in multiple virtual regions displayed by a glasses device;

determine that an orientation of the glasses device changes from a first focus position relative to a first virtual region to a second focus position relative to a second virtual region;

deactivate a first cursor of the multiple cursors in the first virtual region and activate a second cursor of the multiple cursors in the second virtual region; and enable user interaction with the second virtual region via the activated second cursor.

19. The system of claim 18, wherein the instructions are further executable by the one or more processors to maintain multiple static cursors in at least some of the multiple virtual regions.

20. The system of claim 19, wherein the instructions are further executable by the one or more processors to maintain the multiple static cursors in static positions in the at least some of the multiple virtual regions.

\* \* \* \* \*